United States Patent
Virkar et al.

(10) Patent No.: US 7,311,754 B2
(45) Date of Patent: Dec. 25, 2007

(54) MOLECULAR DECOMPOSITION PROCESSES FOR THE SYNTHESIS OF NANOSIZE METALLIC POWDERS

(75) Inventors: Anil Vasudeo Virkar, Salt Lake City, UT (US); Wensheng Wang, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 452 days.

(21) Appl. No.: 10/960,433

(22) Filed: Oct. 6, 2004

(65) Prior Publication Data

US 2005/0115362 A1    Jun. 2, 2005

Related U.S. Application Data

(63) Continuation-in-part of application No. 09/830,399, filed as application No. PCT/US99/24052 on Oct. 26, 1999, now Pat. No. 6,803,027.

(60) Provisional application No. 60/105,697, filed on Oct. 26, 1998.

(51) Int. Cl.
*B22F 9/16* (2006.01)
(52) U.S. Cl. .......................... 75/370; 75/744
(58) Field of Classification Search .................. 75/361, 75/370; 148/513
See application file for complete search history.

(56) References Cited

U.S. PATENT DOCUMENTS

| 5,252,310 | A | 10/1993 | Recasens et al. |
| 5,498,446 | A | 3/1996 | Axelbaum et al. |
| 5,759,230 | A | 6/1998 | Chow et al. |
| 5,863,514 | A | 1/1999 | Sasaki et al. |
| 5,935,275 | A | 8/1999 | Burgard et al. |
| 5,961,938 | A | 10/1999 | Yamamoto |
| 6,033,624 | A | 3/2000 | Gonsalves et al. |
| 6,066,305 | A | 5/2000 | Dugger |

(Continued)

FOREIGN PATENT DOCUMENTS

WO    WO 96/34829    11/1996

OTHER PUBLICATIONS

Edelstein A.S. et al, "NANOMATERIALS: Synthesis, Properties and Application", Institute of Physics Publishing, Bristol and Philadelphia, pp. 3-8.

(Continued)

*Primary Examiner*—George Wyszomierski
(74) *Attorney, Agent, or Firm*—Thorpe North & Western LLP (57) ABSTRACT

A method for synthesizing nanosize metallic powders can include providing a metallic precursor. The metallic precursor can include a metal alloy formed having a fugitive constituent and a target metal. The fugitive constituent and target metal are chosen such that the fugitive constituent can be selectively dissolved or removed by leaching with an appropriate solvent while leaving the target metal undissolved. The fugitive constituent can be leached from the metallic precursor to leave a metallic residue which is a mass of nanosize metallic particles made substantially of the target metal. The nanosize metallic particles can then be recovered from the metallic residue either merely by removing the solvent and/or breaking up the mass of nanosize metallic particles. The disclosed methods allow for a convenient avenue for production of nanosize particles from readily formed materials for use in a wide variety of potential industrial and commercial applications.

9 Claims, 3 Drawing Sheets

U.S. PATENT DOCUMENTS

| | | |
|---|---|---|
| 6,706,795 B1 | 3/2004 | Garti et al. |
| 6,761,866 B1 | 7/2004 | James et al. |
| 6,786,950 B2 | 9/2004 | Yadav et al. |
| 7,182,894 B2 * | 2/2007 | Kumar et al. ............. 264/41 |
| 2006/0112785 A1 * | 6/2006 | Garbar et al. ............. 75/351 |
| 2006/0128565 A1 * | 6/2006 | Flytzani-Stephanopoulos et al. ............. 502/439 |

OTHER PUBLICATIONS

Fecht H.J., Ch. 5, "Formation of Nanostructures by Mechanical Attrition" found in "NANOMATERIALS: Synthesis, Properties and Applications", edited by A.S. Edelstein and R.C. Cammarata, Institute of Physics Publishing, Bristol and Philadelphia, pp. 89-108.

Gopalan S. et al, "Thermodynamic Stabilities of $SrCeO_3$ and $BaCeO_3$ Using a Molten Salt Method and Galvanic Cells", J. Electrochem. Soc., vol. 140 No. 4 pp. 1060-1065 (1993).

Griffiths C.H. et al, "The structure, magnetic characterization, and oxidation of colloidal iron dispersions", J. Appl. Phys., 50(11) pp. 7108-7115 (1979).

Janz G.J. et al., "Nonaqueous Electrolytes Handbook" Academic Press pp. 42-47, 50-55, 62, 63 (1972).

Jolivet J.P. et al, "Formation of Magnetic Spinel Iron Oxide in Solution" found in "Nanophase Materials: Synthesis—Properties—Applications", edited by G. C. Hajipanayis and R. W. Siegal, NATO ASI Series E: Applied Sciences, vol. 260, Kluwer Academic Publishers, pp. 45-48 (1994).

Klein L.C., "Sol-Gel Process" in "Ceramic and Glasses, Engineered Materials Handbook", vol. 4, ASM, Metals Park, OH, pp. 209-212 (1991).

Massalski T.B., Editor-in-Chief, "Binary Alloy Phase Diagrams", vol. 1, ASM International, pp. 602-604 (1990).

Messing G.L. et al, "Characteristics of EDS-Derived Powders", Sci. Ceram. 12, pp. 117-124 (1983).

Nonaka K. et al, "Characterization and control of phase segregation in the fine particles of $BaTiO_3$ and $SrTiO_3$ synthesized by the spray pyrolysis method", J. Mater. Res., vol. 6, No. 8, pp. 1750-1756 (1991).

Sorensen C. M. et al, "Aerosol Spray Pyrolysis Synthesis Techniques" in "Nanophase Materials: Synthesis—Properties—Applications", edited by G. C. Hajipanayis and R. W. Siegal, NATO ASI Series E: Applied Sciences—vol. 260, Kluwer Academic Publishers, pp. 109-116 (1994).

Suslick K.S., "Sonochemistry of Organometallic Compounds" found in "High Energy Processes in Organometallic Chemistry" ACS Symposium Series, vol. 333, American Chemical Society, Washington, DC, pp. 191-208 (1987).

Tanner C.W. et al, "Instability of $BaCeO_3$ in $H_2O$-Containing Atmospheres", J. Electrochem. Soc., 143 No. 4, pp. 1386-1389 (1996).

Xu H.K. et al, "Aerosol synthesis of gadolinium iron garnet particles", J. Mater. Res., vol. 7, No. 3, pp. 712-716 (1992).

* cited by examiner

MOLECULAR DECOMPOSITION PROCESSES FOR THE SYNTHESIS OF NANOSIZE METALLIC POWDERS

RELATED APPLICATIONS

This application is a continuation-in-part of U.S. patent application Ser. No. 09/830,399, filed Aug. 13, 2001, now U.S. Pat. No. 6,803,027 which is a U.S. nationalization under 35 U.S.C. 371 of PCT Application No. PCT/US99/24052, filed Oct. 26, 1999, which claims benefit of U.S. Provisional Patent Application No. 60/105,697, filed Oct. 26, 1998, which are each incorporated herein by reference in their entireties.

FIELD OF THE INVENTION

The present invention relates to processes for use in connection with producing nanosize powders. More particularly, the present invention relates to molecular decomposition processes for producing nanosize metallic powders.

BACKGROUND OF THE INVENTION

Nanosize powders have numerous applications such as catalysts, electrocatalysts, catalyst supports, electrodes, active powders for the fabrication of dense bodies, semiconductors for energy storage, photovoltaics, ultra-fine magnetic materials for information storage, environmental clean-up as destructive adsorbents, water purification, information storage, and optical computers, to name a few. Some of the numerous examples include the following: nanosize (3 to 4 nm) platinum for oxygen reduction in acid electrolytes, many metallic powders made by precipitation in aqueous and non-aqueous media for alloy fabrication and for catalysis, nanosize iron oxide catalyst for coal liquefaction, nanosize iron oxide particles for magnetic applications, tetragonal zirconia powder by a hydrothermal treatment at high pressures for structural applications, carbides and nitrides using non-aqueous media, nanosize $BaTiO_3$ by a gas-condensation process, etc. Many oxides have potential applications as nanosize powders. Some useful oxides include $CeO_{(2-x)}$ for catalytic reduction of $SO_2$, $\gamma$-alumina as a catalyst support and for enhancing ionic conductivity of lithium iodide, $V_2O_5$ as a catalyst for $NO_x$ reduction, and etc. Several processes currently used for the synthesis of nanosize powders include gas-phase condensation, mechanical milling, thermal crystallization, chemical precipitation, sol-gel processing, aerosol spray pyrolysis, and the like.

In gas-phase condensation, evaporation of precursors and their interaction with an inert gas leads to loss of kinetic energy such that homogeneous nucleation of nanosize powders occurs in a supersaturated vapor. Nanocrystalline powders of $TiO_2$, $Li_2O$-doped MgO, $CeO_2$, Y-doped $ZrO_2$, etc. have been produced by gas-phase condensation. Aerosol spray pyrolysis has been used to synthesize $BaFe_{12}O_{19}$, $Fe_2O_3$ among some other materials. High-energy mechanical milling is used extensively to produce nanostructured materials, especially when large quantities of materials are required. Very fine particles of nickel-aluminum alloy, Fe—Co—Ni—Si alloys, Ni—Mo alloys, for example, have been produced by mechanical milling. Contamination by the milling process, however, is a shortcoming of this process. Also, although very fine (nm size) particles can be made, agglomeration is a problem leading to cluster sizes in the micron range.

Chemical co-precipitation has received considerable attention for the synthesis of nanosize powders. Metallic as well as ceramic powders can be made by a careful control of the precipitation chemistry. Alkali metal borohydride, $MBH_4$ where M is an alkali metal, for example, has been used as a reducing agent in aqueous media for the synthesis of metallic powders. Similarly, hydroorganoborates of the general formula $MH_v(BR_3)$ or $MH_v[BR_n(OR')_{3-n}]_v$ where M is an alkali or alkaline earth metal, v=1 or 2, and R, R' are alkyl or aryl groups have been used as reducing and precipitating agents. It is important to control pH and ionic strength in aqueous media to prevent Ostwald ripening. In the synthesis of nanosize iron oxide, for example, it has been shown that the higher the pH and the higher the ionic strength, the smaller the size of nanosize $Fe_3O_4$ particles.

In most methods for the synthesis of nanosize powders, two issues are particularly important. First, the formation of fine uniform size particles, and second, the prevention of agglomeration are important considerations in nanosize particle synthesis. In principle, nanoparticles of a uniform size can be formed by carefully controlling nucleation and growth. Often, a variety of encapsulating methods is necessary to control the size of nanoparticles.

Agglomeration is often the result of Van der Waals forces. The adverse effect of agglomeration on the sintering behavior of ceramic powders is well documented. Even in catalysis, the need for dispersed powders is well known. Often, supercritical drying can be used to obtain non-agglomerated powders. In liquid media, agglomeration can be suppressed through steric hindrance or through the manipulation of electrostatic interactions. The latter in polar liquids can be achieved by changing the pH and the ionic strength of the solution. Many agglomeration suppression techniques involve the use of surfactants. Often, the powders which are non-agglomerated and well dispersed in a liquid, tend to agglomerate during the drying stage. Fortunately, methods such as slip-casting, gel-casting and pressure slip casting can be used to achieve powder compaction in a wet state. Such has been demonstrated using submicron ceramic powders.

With the exception of milling, all the above methods are based on molecular synthesis of nanoparticles wherein the particles are built-up by atom-by-atom, or molecule-by-molecule, addition. Even in processes based on the decomposition of metal carbonyls, the growth of particles occurs via a layer-by-layer addition of atoms. As a result, a control of nucleation and growth is necessary to ensure the formation of nanosize particles. This often requires a very precise and difficult control of the reaction system, which renders the manufacture of the nanosize powder in large quantities impractical or impossible. In addition, the molecular synthesis processes are costly because of relatively large capital expenditures required for the equipment to control the formation of only a small quantity of nanosize product. As such, devices and methods for producing nanosize materials continue to be sought through on-going research and development efforts.

It is, therefore, an object of the present invention to provide methods for the formation of nanosize powders that are easy to implement on an industrial scale and is relatively inexpensive when compared to molecular synthesis methods. Another object of the invention is to provide methods in which nanosize powders are formed by a process other than precipitation or deposition from solutions, thus eliminating the possibility of unwanted deposition and growth of the nanosize powders.

SUMMARY OF THE INVENTION

Accordingly, the present invention provides processes for producing nanosize metallic powders which avoid many of the above difficulties. Such methods for synthesizing nanosize metallic powders can include providing a metallic precursor. The metallic precursor can include a metal alloy formed having a fugitive constituent and a target metal. The fugitive constituent and target metal are chosen such that the fugitive constituent can be selectively dissolved or removed by leaching with an appropriate solvent while leaving the target metal substantially unaltered. Typically, the target metal can be substantially insoluble in the solvent. Further, it is preferable that substantially no particle growth occur at any point during formation or recovery of the nanosize particles. The fugitive constituent can be leached from the metallic precursor to leave a metallic residue. Thus, the metallic residue is a mass of nanosize metallic particles made substantially of the target metal. The nanosize metallic particles can then be recovered from the metallic residue either merely by removing the solvent and/or breaking up the mass of nanosize metallic particles.

In one detailed aspect of the present invention, the metal alloy can be a standard metal alloy or an intermetallic alloy. Similarly, the metal alloy can be a substantially single phase material. Alternatively, multi-phase alloys can be used as the metal alloy.

In another more detailed aspect of the present invention, the metallic precursor can be $AuCu_3$, $BaPd$, $AuCa_2$, $AuMg_2$, $AuMg_4$, $AgMg_4$, $AgCa_2$, $PtNi_x$, $PtSn_4$, $PtSn_2$, $PtCu_3PdSn_4$, $PdCu_3$, $PdCa_x$, $PdMg_x$ (x=1, 1.5, 2.5, 3), or combinations of these alloys.

In yet another aspect of the present invention, leaching can be accomplished by using a solvent. Strong acids can make particularly suitable solvents. Suitable strong acids can include hydrochloric acid, nitric acid, sulfuric acid, phosphoric acid, hydrogen iodide, hydrogen bromide, and mixtures of these acids.

In another aspect of the present invention, vibrational energy can be optionally applied to the metallic residue in order to facilitate leaching and/or recovery of the nanosize particles from the metallic residue.

In still another aspect of the present invention, a capping agent can be added to the nanosize metallic particles.

In another detailed aspect of the present invention, nanosize metallic particles recovered can have an average particle size from about 2 nm to about 100 nm.

Thus, the present invention is based on molecular decomposition, rather than molecular synthesis, particle growth, or deposition. As discussed above, one of the problems with many methods of synthesizing nanosize powders is that often it is difficult to synthesize large quantities of materials. In contrast, the present invention is suitable for making large quantities of nanosize powders from a number of precursor materials.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

The figures herein are provided merely for illustrative purposes and dimensions and relative proportions are not always to scale, except in the cases of photomicrographs.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a metallic precursor" includes one or more of such precursors, reference to "a fugitive constituent" includes reference to one or more of such materials, and reference to "an alloying technique" includes reference to one or more of such techniques.

Definitions

In describing and claiming the present invention, the following terminology will be used in accordance with the definitions set forth below.

As used herein, "nanosize" when referring to particle size in the nanometer range, i.e., less than a few hundred nanometers, e.g., 300 nanometers or less.

As used herein, "single phase material" refers to a material where the differentiation between the target metal and the fugitive constituent is on a molecular level such that the entire material has substantially a single compositional structure. Accordingly, the metallic precursor would exist as a compound existing in the form of an alloy, i.e. a crystal lattice containing target metal and fugitive constituent at either lattice positions or at interstitial locations.

As used herein, "fugitive constituent" refers to any component of the metallic precursor which is capable of being removed while leaving the target metal. The fugitive constituent can also be a function of the leaching method and/or solvent used. For example, a particular component can be more soluble in one solvent than other components, while the reverse solubility may exist when using a second solvent.

As used herein, "metallic" refers to a metal, or an alloy of two or more metals. A wide variety of metallic materials is known to those skilled in the art, such as aluminum, copper, chromium, iron, steel, stainless steel, titanium, tungsten, zinc, zirconium, molybdenum, etc., including alloys and compounds thereof.

As used herein, with respect to an identified property or circumstance, "substantially" refers to a degree of deviation that is sufficiently small so as to not measurably detract from the identified property or circumstance. The exact degree of deviation allowable may in some cases depend on the specific context. Thus, for example, a target metal which is "substantially unaltered" may have some atoms near particle surfaces which are rearranged upon removal of the fugitive constituent.

As used herein, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc.

This same principle applies to ranges reciting only one numerical value. Furthermore, such an interpretation should apply regardless of the breadth of the range or the characteristics being described.

Invention

The present invention provides a process for forming nanosize metallic powders which includes providing a metallic precursor. The metallic precursor can include a metal alloy having a fugitive constituent and a target metal. The fugitive constituent can be leached from the metallic precursor to leave a metallic residue. The metallic residue can be a mass of nanosize metallic particles which are substantially the target metal. Typically, leaching can be accomplished by contact with a selective solvent to form a solution of the fugitive constituent and leaving the non-soluble metallic residue. Preferably, the fugitive constituent can be sufficiently soluble in the solvent such that a solution of the fugitive constituent is formed without precipitation and deposition of fugitive constituent on the metallic residue. Subsequently, the selective solvent solution can be removed from the metallic residue and then the nanosize metallic particles can be recovered from the metallic residue, e.g., by sonication, crushing or the like.

One of the objects of the present invention is to prevent deposition or precipitation of dissolved materials upon the metallic residue which is substantially the target metal remaining after leaching of the fugitive constituent. Deposition of dissolved fugitive constituent will not only contaminate the residue, but possibly result in particles that are too large, i.e., via particle growth. In the present invention, an object is to substantially eliminate, if not completely prevent, deposition of dissolved materials and the resulting growth of existing crystals. Unlike prior-art methods where small crystals are crystallized from solution, it is practical in the present invention to inhibit the crystallization and precipitation process altogether, as crystallization is not required to form nanosize crystals or to initiate particle growth. Accordingly, as further illustrated below, a precursor material can be chosen such that precipitation of any material upon the nanosize particles is essentially avoided.

Ultimately, the invention involves a balance between preventing metallic precursor and target metal from forming a solution such that these materials cannot redeposit and grow crystals, and removing the fugitive constituent which is sufficiently soluble in solution that the fugitive constituent will not precipitate from the solution to grow crystals.

Metallic Precursor Materials

A wide variety of materials can be suitable for use in connection with producing the metallic precursors of the present invention. The present invention is suitable for the synthesis of many types of powders. Although the following discussion covers a number of specific materials, the applicability of the present invention to other metallic materials will be evident to one of ordinary skill in the art. The metallic precursors can typically comprise a metal alloy. Those skilled in the art are familiar with a large number of methods for forming various metal alloys. Non-limiting examples of these processes can include powder metallurgy, arc melting, mold casting, cold crucible casting, centrifugal casting, sputtering, rapid quenching, mechanical alloying such as ball milling or attrittors, and the like. Suitable metal alloys can include almost any metal alloy which has at least one fugitive constituent which has a solubility greater than one or more target metals in a particular solvent. Further, suitable metal alloys can include sufficient fugitive constituent content such that upon leaching, the remaining metallic residue is sufficiently porous to produce a mass of nanosize particles.

In one aspect of the present invention, the metal alloy can be an intermetallic alloy. The intermetallic alloy can be almost any alloy satisfying the requirements of the present invention discussed herein. Non-limiting examples of suitable intermetallic alloys can include Au—Cu alloys such as $AuCu_3$, $AuCu$ and $Au_3Cu$, Al—Ti alloys such as $AlTi_3$, $AlTi$, $Al_5Ti_3$, $Al_2Ti$, and $Al_3Ti$, Al—Ni alloys such as $AlNi_3$, $Al_3Ni_5$, $AlNi$, $Al_3Ni_2$ and $Al_3Ni$, Fe—Al alloys, Ni—Si alloys, Ni—Ti alloys, Co—Ti alloys and combinations of these alloys. Currently preferred intermetallic alloys include $AuCa_2$, $AuMg_2$, $AuMg_4$, $AgMg_4$, $AgCa_2$, $PdSn_3$, $PdSn_4$, $PdCu_3$, $PtNi_x$, $PtSn_2$, $PtCu_3$, $PdCa_x$ (where x=1.5, 2.5, 3, or 9), $PdMg_x$ (where x=1,2.5,3,4, or 6).

Alternatively, the metal alloy can be a binary, ternary or quaternary metal alloy of a wide variety of metals. Suitable metal alloys which can be used include, but are not limited to, Ba—Pd alloys, copper alloys, iron alloys, silver alloys, aluminum alloys, titanium alloys, or the like. Currently preferred metal alloys can include, but are not limited to, Ba—Pd alloys, Au—Cu alloys, Al—Ti alloys, Al—Ni alloys, Fe—Al alloys, and combinations thereof. For example, synthesis of Pd nanosize powder can be achieved with a metallic precursor of an approximately equimolar alloy of Ba and Pd, which is actually a line compound BaPd. The powdered alloy is then treated in dilute HCl to leach the barium to form nanosize palladium. $AuCu_3$ alloys can be similarly produced and used in the present invention.

Suitable metal alloys can be chosen such that the target metal is a desired metal for use as a nanosize particle. Common target metals can include, but are not limited to, Au, Pd, Cu, Ag, Ti, Fe, Al, Rh, Ru, Ir, and combinations or alloys thereof. Further, the metal alloy can be a ternary intermetallic or ternary alloy such that the target metal is a binary alloy. For example, Au—Ag—Cu alloys, Pb—Sb—Sn alloys, Fe—Ni—Cr alloys, or the like.

In one alternative embodiment, a metallic precursor can include the fugitive constituent and the target metal in a single phase. This can improve leaching of the fugitive constituent from the target metal to form nanosize particles.

However, it will be understood that the present invention can also be used in connection with multi-phase metals, e.g., solid solutions of multiple alloys having different compositions. In this case, the metal alloy of the metallic precursor can be tailored to achieve specific porosity, nanosize particle yields per volume of precursor, and metal particle sizes.

Synthesis of Nanosize Metallic Particles from the Precursor

The nanosize metallic particles can be formed from the metallic precursor by leaching of the fugitive constituent. Although the nanosize metallic particles are formed, this process can also be viewed as a process of releasing the nanosize metallic particles from the metallic precursor. Thus, the process of the present invention is formation of nanosize particles by molecular decomposition of a portion of the precursor rather than particle growth.

In one aspect of the present invention, leaching of the fugitive constituent can be accomplished using a solvent. Suitable solvents can be any capable of leaching the fugitive constituent while leaving the target metal undissolved. Preferably, the target metal is substantially insoluble in the solvent. Non-limiting examples of suitable solvents include acids such as hydrochloric acid, nitric acid, sulfuric acid, carbonic acid, hydrogen iodide, phosphoric acid, hydrogen bromide, organic acids such as acetic acid, halogenated acetic acids, ascorbic acid, carboxylic acids, dicarboxylic acids and the like, or other known acids. Currently preferred solvents include strong acids such as hydrochloric acid, nitric acid, sulfuric acid, and phosphoric acid. Optionally, solvents such as aqueous solutions containing $Fe^{+3}$ can also be used as the solvent. Weaker and/or dilute acids can also be used depending on the composition of the metallic precursor and the geometry of the precursor. Leaching can require a significant period of time, depending on the particular metals and solvent used. For example, leaching times from about 10 hours to about 30 hours are common. Optimal leaching times can be readily determined by SEM micrographs or by otherwise testing the residue at various times. Leaching time can be optionally decreased by first milling the precursor material down to a particle size sufficient to form a fine powder, e.g., a few microns in size.

The solvent can be chosen such that during leaching, substantial particle growth of the nanosize metallic particles is avoided. Alternatively, the solvent can be provided in the form of an acid gas such as $SO_3$, $N_2O_5$, $CO_2$ or HCl. Similarly, the solvent can be provided in the form of a gas such as $CO_2$ and/or $SO_3$ in polar, non-aqueous solvents.

In yet another alternative, the solvent can be provided such that reactions occur with non-aqueous electrolytes such as reactive gases in polar, non-aqueous solvents. This approach is particularly suitable when there is a tendency to form hydroxides of the target metal when the objective is to synthesize nanosize powders with minimal agglomeration. In such cases, the use of non-aqueous, polar liquids may be necessary. A few suitable non-aqueous solvents, which can be used for non-aqueous electrolytes include formamide, N-methyl acetamide, N-methyl formamide, N-methyl propionamide, propylene carbonate, ethylene carbonate, or the like. The polar liquid used as a solvent should also have a reasonable solubility for the reacting gas, which may be, for example, $CO_2$, $SO_3$, $SO_2$, $N_2O_5$, or other similar gases. Suitable solvents can be selected based on the following criteria: (i) the solubility of the reacting gas in the solvent, and (ii) the solubility of the fugitive compound formed from the fugitive constituent and the solvent composition. In order to increase contact between the metallic precursor and the solvent, a suspension of a metallic precursor powder can be agitated, e.g. by constant stirring, while the reacting gas is bubbled through the suspension.

Regardless of the particular solvent and associated leaching process used, the solvent can then be removed from the remaining non-soluble constituents to leave the metallic residue. The metallic residue is typically a mass of nanosize metallic particles comprised substantially of, or consisting essentially of, the target metal. The solvent can be removed by conventional methods, including, but not limited to, settling, centrifugation, filtering, air drying, or a combination of these methods. The solvent can also be removed by displacing it with another liquid, such as replacing an aqueous solvent with an alcohol, and then separating the powder from the displacement liquid. Using a displacement liquid can be desirable to inhibit agglomeration of the nanosize metallic powder during drying.

In many cases, the solvent can be chosen such that thermodynamically favorable reactions occur during leaching. The tendency for agglomeration can also be minimized, by either replacing water with an alcohol or other organic liquids of high vapor pressures, or drying under supercritical conditions. It is also within contemplation of the invention to use surfactants to minimize agglomeration based on either electrostatic interactions or steric effects.

The remaining metallic residue can be in the form of a mass of individual nanosize metallic particles or can be an interconnected mass which is sufficiently porous such that nanosize metallic powders can be readily recovered therefrom. For example, the metallic residue can be friable such that crushing or pulverization of the mass reduces the mass into nanosize particles. Alternatively, or in addition to crushing, the metallic residue can be subjected to vibrational energy using either ultrasonic and/or sonic energy. In the case where the process of leaching leaves a mass of individual metallic particles, the step of recovering can merely involve removal of the solvent or other materials therefrom.

The nanosize metallic particles can have a wide variety of sizes depending on the materials used and the leaching time. As a general guideline, synthesized particles can have an average particle size from about 1 nm to about 400 nm, and preferably from about 2 nm to about 200 nm, although sizes outside this range can also be synthesized using the methods of the present invention. Interestingly, the nanosize particles produced typically have smaller particle sizes than the starting materials used in production of the metallic precursor, e.g., via powder metallurgy, which are usually in the micron range, e.g., tens to hundreds of microns.

In an optional additional step, capping agents can be added to the nanosize metallic particles in order to prevent particle growth and agglomeration. Capping agents are well known to those skilled in the art and can be chosen based on the specific metallic particle composition and desired results. Suitable capping agents can include, but are not limited to, thiols such as dodecanethiol, 4-nitrothiol phenol, 4-hydroxythiol phenol, and $SC_2H_4Ph$; citrates; phosphines; amines; phosphates; chlorosilanes; disilazanes; ammonia, methyl amine, ethyl amine, actonitrile, ethyl acetate, methanol, ethanol, propanol, butanol, pyridine, ethane thiol, tetrahydrofuran, diethyl ether, and the like. Currently preferred capping agents include thiols, citrates, phosphines, and amines.

Mechanism and Kinetics of Synthesis of Nanosize Metallic Powders

The kinetics of the formation of nanosize powders is a factor that should be considered in choosing the precursor and solvent for the desired nanosize metallic particles. Assuming a given reaction is favored over undesired competing reactions, an important consideration is the kinetics of the reaction. With reference to the schematic of the reaction given in FIG. 1, the kinetics of the reaction depend upon the transport of soluble reactants and products through the metallic precursor-metallic residue mass 11. The overall reaction mechanism is expected to involve the following steps: (a) transport of solvent, e.g., dissolved reacting gas or their respective acids, through the porous metallic residue layer 13 comprising the target metal to the interface 15 separating the metallic precursor 17 and the porous metallic residue layer, (b) reaction at the interface, and (c) transport of the dissolved byproduct from the interface 15 through the porous metallic residue layer, into the bath.

Figure 1:
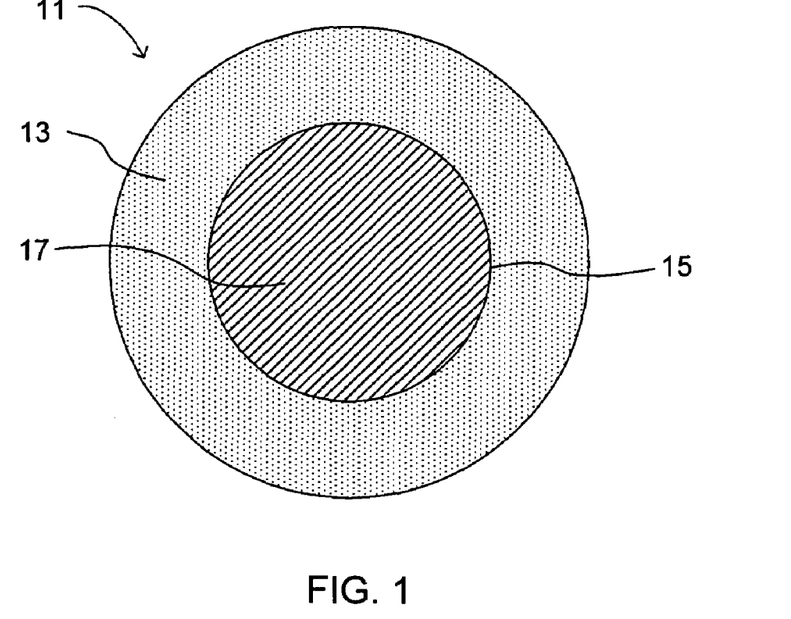
FIG. 1 is a schematic showing a metallic precursor during leaching in accordance with one embodiment of the process of the present invention.

The overall kinetics can be influenced by all three of the above factors, and will be dictated by whichever is the slowest, rate-limiting step. The solubility of a reacting gas is a function of pressure; the higher the pressure, the higher the solubility. Both the kinetics of the actual reaction occurring at the interface, as well as transport through the porous layer are functions of the concentration of the dissolved reactant species. A higher concentration generally corresponds to faster rate of reaction. The temperature dependence of the reaction at the interface, however, will in general be different from that of the transport of dissolved species. Thus, during leaching, the metallic precursor 17 tends to shrink as the fugitive constituent is removed to leave the porous metallic residue layer 13. This illustrates the desirability of reducing the size of the metallic precursor somewhat in order to reduce the time required to leach the fugitive constituent therefrom. Known theoretical models for describing transport through porous bodies can be used in this analysis.

Propensity for Particle Growth

One advantage of the present invention over the other methods for the synthesis of nanosize powders is that there is negligible tendency for the occurrence of particle growth by either Ostwald ripening or by precipitation under the present invention. This negligible particle growth is primarily due to neither the precursor nor the desired product being soluble in the solvent. Since the product is nanosize, solubility is often higher than bulk materials. It is known, for example, that the solubility of a sparingly soluble species is related to its size by Equation 1.

$$C(r) \approx C(\infty)\exp\left[\frac{2\gamma\Omega}{rk_BT}\right] \quad (1)$$

where, $C(\infty)$ is the bulk solubility (particle of a large radius), $C(r)$ is the solubility of a particle of radius r, $\gamma$ is the particle-solvent interfacial energy, $\Omega$ is the molecular volume of the particle, $k_B$ is the Boltzmann constant, and T is the absolute temperature, assuming the following values for the identified parameters: $r\sim2$ nm, $\gamma\sim0.5$ J/m$^2$, $\Omega\sim0.125$ nm$^3$ (125 Å$^3$), and T=350 K, the ratio $C(r)/C(\infty)$ is about 3.6. This result shows that as long as $C(\infty)$ is rather low, even for nanosize particles the solubility enhancement is not large enough to cause Ostwald ripening. Thus, there should be negligible particle growth.

Characterization of Sintered Bodies

The sintering or consolidation behavior of nanosize powders synthesized by the present invention is expected to result in sintering at lower temperatures, resulting in a finer microstructure. The grain size of sintered bodies made from the nanosize powders should be smaller than those made from conventional powders. It is well known that very fine-grained materials often exhibit interesting properties, such as, for example, superplasticity at elevated temperatures, and high strength at low temperatures.

Additional Observations

The process of the present invention for the synthesis of nanosize metallic powders is simple, and can be adapted by using known chemical leaching technologies. Typically, the process does not require exotic equipment or exotic precursors. The precursors can be made by known and readily available alloy fabrication methods. The starting particle size of the precursors need not be particularly small, although smaller precursors can allow for reduced leaching times. Finally, the process has a general applicability for a wide range of materials. The process thus is easily amenable to scale up for production of large quantities of nanosize materials.

In summary, nanosize powders of a variety of materials are usually made by one or more processes which may be categorized as belonging to molecular synthesis wherein particles are built up or grown on an atom-by-atom or a molecule-by-molecule addition on a particle nucleus. The methods of the present invention generally result in nanosize particles of a substantially uniform composition and size. Further, particle coarsening can be avoided such that intergrowth of particles can be avoided and reduced particle sizes can be achieved. Additionally, the molecular level distribution of the fugitive constituent in the metallic precursor results in a substantially uniform particle size distribution upon removal of the fugitive constituent, i.e. the remaining target metal has very uniform spaces or porosity created between particles.

EXAMPLES

The following examples illustrate various embodiments of the invention. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Gold and copper powders having average particle sizes of about 50 microns were mixed in an atomic ratio of 1:3 (weight ratio of 2.5:2.4195) to form a powdered mixture. The powdered mixture was pressed and placed in a quartz boat, which was placed in a quartz tube and then inserted into a tube furnace. The furnace temperature was raised to 1100° C. while circulating hydrogen gas through the quartz tube to prevent oxidation of copper. The temperature was maintained at 1100° C. for 30 minutes to allow gold and copper to melt and form a substantially homogenous solution. Subsequently, the furnace temperature was lowered rapidly to 370° C. within about 40 minutes. The sample was maintained at 370° C. for about 96 hours to form an ordered superlattice of AuCu$_3$ metal alloy. The sample was then cooled to room temperature. One sample was also prepared in the disordered (random) state, by simply cooling to room temperature, without the thermal treatment at 370° C.

Figure 2:
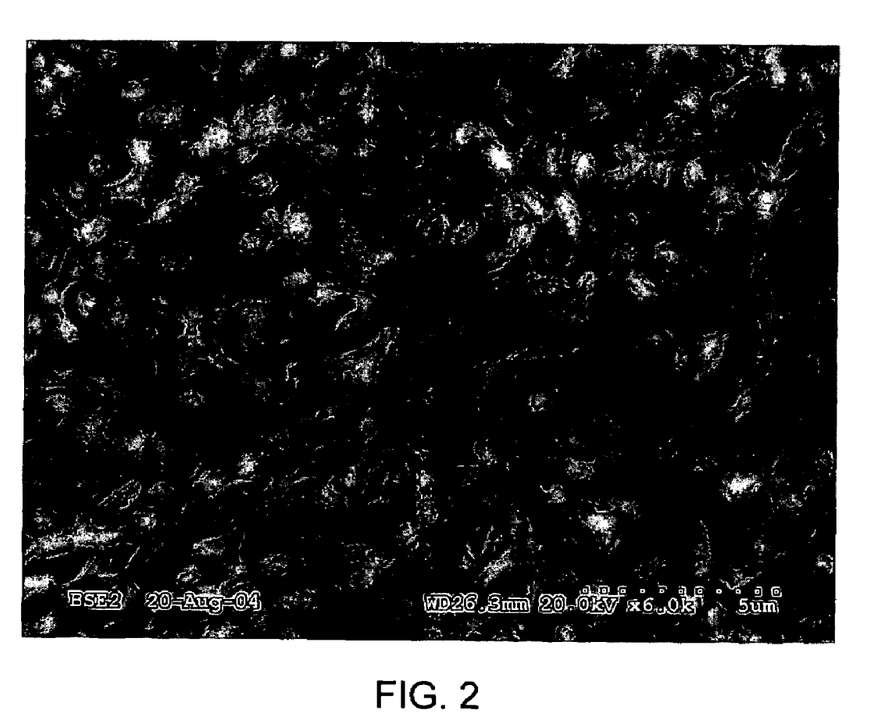
FIG. 2 is an SEM image of a random $AuCu_3$ alloy, made by deforming an originally ordered alloy, after 19 hours in 8M $HNO_3$ in accordance with one embodiment of the present invention.
Figure 3:
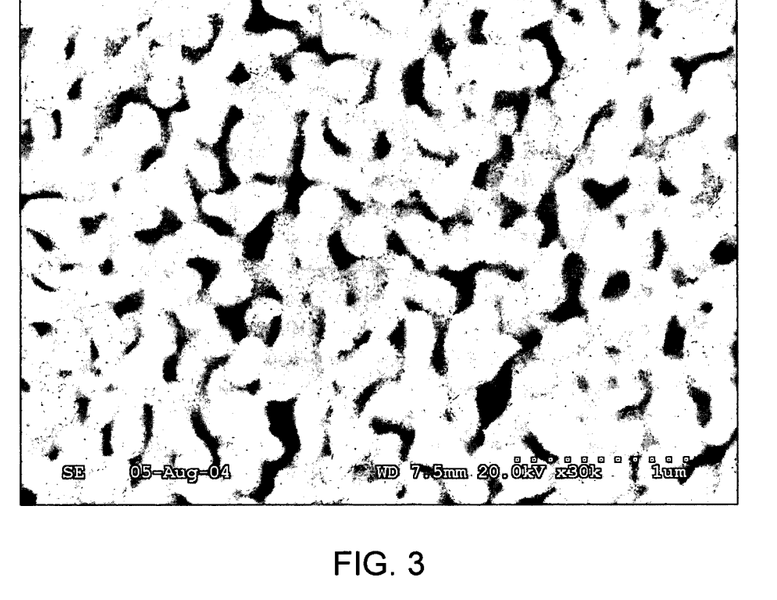
FIG. 3 is an SEM image showing a magnified view of another random AuCu3 alloy after a treatment in $HNO_3$, similar to that for the sample shown in FIG. 2.

The copper portion was selectively dissolved by immersing the AuCu$_3$ alloy (either ordered or random) into concentrated aqueous 8M HNO$_3$ solution, followed by stirring or sonication for about 19 hours. In this step, the fugitive constituent of copper from the alloy is partially or completely dissolved and a porous gold structure is formed. Dissolution rate of copper was increased by stirring in comparison to that by sonication alone. The resulting porous gold residue structures were analyzed using scanning electron microscopy (SEM). Selected SEM micrographs are shown in the attached FIGS. 2 through 4. FIG. 2 shows a random AuCu$_3$ alloy after 19 hours in 8M HNO$_3$ where substantially all of the copper has been leached away. The remaining structure is a highly porous loosely agglomerated mass of nanosize gold particles. FIG. 3 is a photomicrograph of an ordered AuCu$_3$ alloy after 19 hours in 8M HNO$_3$. The particle size resulting from use of the ordered alloy as a metallic precursor was smaller than the random alloy. However, the kinetics of leaching was slower in the case of the ordered alloy.

Figure 4:
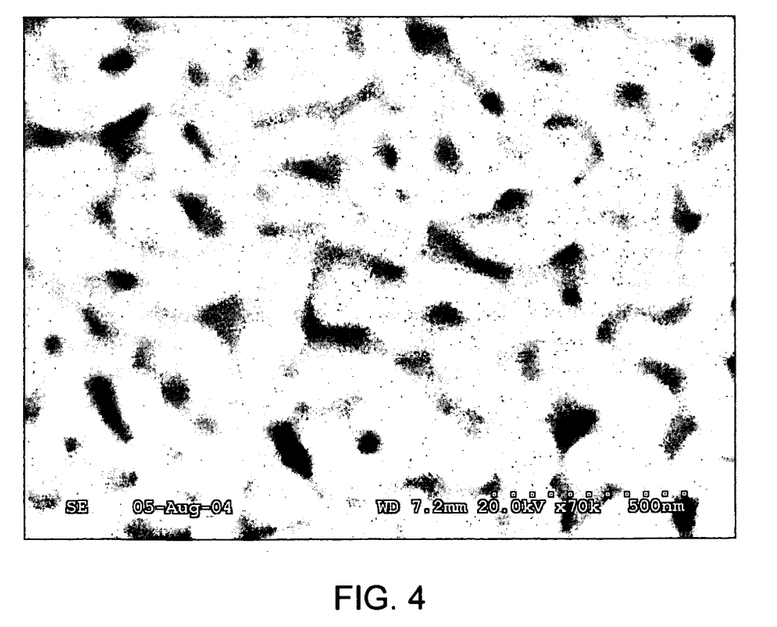
FIG. 4 is an SEM image of an ordered $AuCu_3$ alloy after 19 hours in 8M $HNO_3$ in accordance with another embodiment of the present invention.
Figure 5:
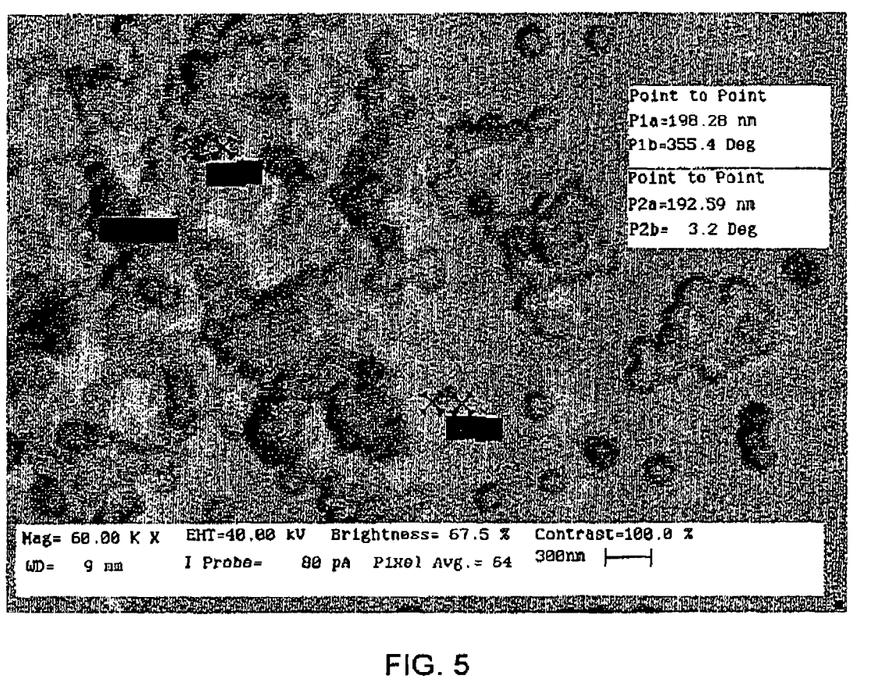
FIG. 5 is an SEM image of nanosize gold particles subsequent to sonication.

After dissolution in the acid, the nanosize gold particles were separated from the acid solution. The gold particles were then mixed with toluene containing a capping agent, i.e. dodecanethiol, followed by sonication. A finely dispersed suspension of nanosize gold particles was formed. SEM analysis shows the particle sizes fall in the nanometer range of about 50 nm, as shown in FIGS. 4 and 5.

Example 2

Synthesis of nanosize palladium can be accomplished using BaPd, which is an intermetallic line compound. An amount of BaPd is formed by conventional powder metallurgy. The alloy is then reacted with HCl for an extended time of about 20 hours. It is readily shown that the $\Delta G^0$ for the reaction, $$BaCl_2 + Pd \rightarrow Ba + PdCl_2$$

is positive suggesting that the first compound to be formed is BaCl$_2$. The BaCl$_2$ formed dissolves into water to form nanosize palladium powder. The palladium powder is nanosize and continues to remain nanosize since palladium has a negligible solubility in water. Thus, as long as the concentration of HCl is low, and there is ample BaPd to react with the HCl, PdCl$_2$ will not form. Note that this process differs from the synthesis of palladium by the reduction of PdCl$_2$. In the latter case, particle growth of Pd readily occurs since the deposition of Pd on the already formed Pd powder continues to occur as PdCl$_2$ in solution reacts with a reducing agent, e.g., an alkali metal borohydride. By contrast, the process of the present invention leads to the formation of nanosize palladium with negligible particle growth.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method for synthesizing nanosize metallic powders, comprising the steps of:
    a) providing a metallic precursor comprising a metal alloy including a fugitive constituent and a target metal;
    b) leaching the fugitive constituent from the metallic precursor to leave a metallic residue, said metallic residue being a mass of nanosize metallic particles comprised substantially of the target metal; and
    c) recovering the nanosize metallic particles from the metallic residue.

2. The method of claim 1, wherein the step of leaching is accomplished using a liquid solvent.

3. The method of claim 2, wherein the liquid solvent comprises an acid selected from the group consisting of hydrochloric acid, nitric acid, sulfuric acid, carbonic acid, and mixtures thereof.

4. The method of claim 2, wherein the target metal is substantially insoluble in the solvent.

5. The method of claim 1, wherein the method does not contribute to substantial particle growth of the nanosize metallic particles.

6. The method of claim 1, wherein the metal alloy is an intermetallic compound.

7. The method of claim 1, wherein the metal alloy is a substantially single phase material.

8. The method of claim 1, wherein the metallic precursor is a Ba—Pd alloys.

9. The method of claim 1, wherein the nanosize metallic particles have an average particle size of less than 100 nm.

* * * * *